Patented Nov. 27, 1951

2,576,735

UNITED STATES PATENT OFFICE 2,576,735

NITROGENOUS RESINS FROM KETONE-ALDEHYDE-NITROGENOUS BASE AND PHENOL-ALDEHYDE

George Karl Vogelsang, La Mott, Pa., assignor to The Borden Company, New York, N. Y., a corporation of New Jersey No Drawing. Application October 21, 1948, Serial No. 55,829

12 Claims. (Cl. 260—43)

The present invention relates to a novel type of nitrogenous resin and in particular to one produced by reacting a potentially reactive phenol-aldehyde condensation product with an amino-ketone-aldehyde condensation product.

The prime object of the present invention is to provide a new and novel type of nitrogenous resin.

A further object is to provide a class of nitrogenous resins derived from relatively abundant and cheap raw materials and intermediaries.

Another object of the present invention is to devise a method for the production of a novel type of nitrogenous resin.

A more specific object of the present invention is to produce a new nitrogenous resin by reacting a potentially reactive phenol-aldehyde condensation product with certain novel reactive amines.

The complex chemistry of the reactive amines utilized in carrying out the present invention and of the resins which form the subject matter of the present invention are currently too imperfectly understood to permit of assigning characteristic structural formulae to these materials. Consequently, in defining these condensation products it is necessary to characterize them in terms of their derivation and in terms of their known and inherent physical and chemical attributes.

In copending applications, Serial No. 22,726, filed April 22, 1948, by Emil E. Novotny and George Karl Vogelsang and entitled "Reactive Amines" there is described a novel type of reactive amine which may be broadly designated as an amino-ketone-aldehyde condensation product and will be referred to hereinafter as "amino KAR." This product is substantially non-resinous. It has been discovered that when this non-resinous product is reacted under suitable conditions with a potentially reactive phenol-aldehyde, a novel resin is formed having very desirable characteristics. It is to that resin, a derivative of the reactive amine of the aforesaid application, Serial No. 22,726, to which this specification is directed.

The nature of the substances which go to make up "Amino KAR" is described with great particularity in said copending application. It is there disclosed that only ketone-aldehyde condensation products derived from methyl ketones and only aliphatic aldehydes containing five or fewer carbon atoms are suitable, and that only those condensation products derived from the reaction between the aforementioned ketones and aldehydes which are fusible, soluble, substantially non-resinous, substantially non-volatile, and reactive may be employed.

Unsaturation in the aldehyde or the ketone employed in the making of the ketone-aldehyde condensation product does not appear to materially affect the characteristics associated with the amines of the present invention.

Ketone-aldehyde condensation products suitable for use in the present invention are best prepared by reacting a ketone with an aldehyde (both as above defined) in the presence of an appropriate catalyst. It is not my intention to here set forth any detailed procedure as to the method of making ketone-aldehyde condensation products of the type indicated as suitable for use in the instance of the present invention, inasmuch as the technical and patent literature abounds in detailed descriptions as to their preparation. In the interest of specificity, however, I refer to U. S. Patent No. 2,191,802 as setting forth the preparation of ketone-aldehyde condensation products preeminently suited for use in the present invention. Of the various condensation products therein described the material referred to as "standard AFR" is ideally suited for use in the present invention. In connection with the "standard AFR," it is interesting to note that in spite of its "resinous" appearance, it has been found that this product is essentially non-resinous in character—it is possessed of a low molecular weight, can be distilled in a molecular still, and can readily be acetylated to an acetate which is readily distillable and crystallizable. It is to be distinctly understood, however, that one is not limited to the use of ketone-aldehyde condensation products produced in accordance with said patent, but can utilize any and all condensation products that fall within the framework of the above defined limitations.

As is set forth in said application Ser. No. 22,726, the nitrogenous base which is reacted with the ketone-aldehyde condensation product must, in order to form "amino KAR," possess two essential attributes. In the first place, the nitrogenous base must contain at least one reactive hydrogen atom attached to the basic nitrogen atom. In effect this limitation restricts the nitrogenous base to ammonia, primary and secondary amines, or tetra alkyl ammonium bases which can break down to yield primary or secondary amines.

The second limitation concerns itself with the strength of the base, usually defined in terms of its dissociation or ionization constant. I have found that to be suitable for use in the present invention the nitrogenous base should possess an ionization constant of not less than $1 \times 10^{-8}$. In effect this limitation implies that a nitrogenous base wherein the amino group is adjacent to a strongly electro-negative group, such as a carbonyl radical or an aromatic nucleus, is unsatisfactory for the purposes of the present invention because the ionization constant of such compounds is 10 to 1,000,000 times too low.

As a result of the above limitations, "amino KAR's" may be defined as fusible, soluble, substantially non-resinous and substantially non-volatile reactive amines resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3$—CO—R', wherein R' represents an aliphatic radical having from one to four carbon atoms, with an aldehyde having the general formula R''—CHO, wherein R'' represents a member selected from the group consisting of hydrogen and aliphatic radicals having from one to four carbon atoms, said nitrogenous base possessing an ionization constant of not less than $1 \times 10^{-8}$ and containing at least one reactive hydrogen atom attached to a basic nitrogen atom.

Various examples of pertinent reactive amines and of the method of producing the same are set forth in detail in the aforesaid copending application, Serial No. 22,726 and need not be further elaborated upon here.

When an "amino KAR" is caused to react with a proper phenol-aldehyde condensation product, the resin of the present invention is brought into being. Of the vast number of phenol-aldehyde condensation products available only those of the "potentially reactive type" may be reacted with "Amino KAR" to form the resins of the present invention. The term "potentially reactive" relates to the characteristic common to some phenol-aldehyde condensation products of being convertible to the infusible, insoluble, and thermorigid state (the so-called "C" stage) upon long standing at ordinary temperatures or rapidly under the influence of heat. Potentially reactive phenol-aldehyde condensation products are to be distinguished from such condensation products of the "novolak" type which require the action of curing or hardening agents to procure "C" stage resins.

The potentially reactive phenol-aldehyde condensation products suitable for use in the present invention are similar to those described as suitable for use in the production of potentially reactive resinous compositions from ketone-aldehyde condensation products as is set forth in my copending application, Serial No. 30,733, filed June 2, 1948, and entitled "Potentially Reactive Compositions Possessing Resinoid Characteristics" and in my copending application, Serial No. 40,165, filed July 22, 1948, and entitled "Potentially Reactive Resinous Compositions Possessing Resinoid Characteristics." It will be noted that in those copending applications the ketone-aldehyde condensation product has not been reacted with a nitrogenous base prior to its reaction with the phenol-aldehyde condensation product, thus differentiating over the present invention.

The reactivity between "Amino KAR" and phenol-aldehyde condensation products apparently derives from the "dual reactivity" characteristic of the "Amino KAR" as described more in detail in copending application, Serial No. 22,726. It is there disclosed that this "dual reactivity" appears to consist of the reactivity normally associated with an amine and the reactivity normally associated with the ketone-aldehyde condensation product. That ketone-aldehyde condensation products are reactive with phenol-aldehyde condensation products to produce novel substances is set forth in copending applications, Serial Nos. 30,733 and 40,165. It is the "dual reactivity" of the "Amine KAR's" which permit them, in contradistinction to other known amines, to react with the phenol-aldehyde condensation products and form the nitrogenous resins of the present invention.

As is pointed out in application, Serial No. 40,165, the resinous compositions there disclosed cannot be obtained in a grindably hard form because of a premature gelation which takes place. By way of contrast, the resinous compositions of the present invention, derived from ketone-aldehyde condensation products which have been reacted with a suitable nitrogenous base, may be procured in a grindably hard form. This fact is not only indicative of the difference in nature between the resinous compositions described in the aforementioned copending applications and the resinous compositions of the present invention, but also constitutes one prime advantage of the resins of the present invention.

It has also been found that while, as set forth in copending application, Serial No. 40,165, certain potentially reactive phenol-aldehyde condensation products are preferred, in the pursuit of the present invention it has been discovered that somewhat greater leeway exists with regard to the nature of the potentially reactive phenol-aldehyde condensation products which may be employed with best results. Thus, potentially reactive phenol-aldehyde condensation products covering a wider range of viscosities may be employed, more variation in the ratio of aldehyde to phenol is tolerable, and condensation products having widely varying inherent curing rates may be employed. This greater latitude appears to derive from the faculty of "Amino KAR" to consume substantial quantities of any free or loosely tied aldehyde which may be present and, as has already been pointed out, the reduced tendency of the reaction mixture toward gelling when "Amino-KAR" is one of the reactive constituents.

The first step, from a generalized point of view, in producing the resins of the present invention, is to bring the "Amino-KAR" into intimate contact with the appropriate phenol-aldehyde condensation product so as to secure a homogeneous mixture. This mixture is then subjected to conditions of controlled resinification by subjecting it to a predetermined time-temperature schedule. A catalyst may or may not be used. Other materials may or may not be included for the purpose of modifying the resin or accentuating certain particular qualities.

Catalysts where employed may be acidic or alkaline in nature. As a general rule a mildly alkaline environment is preferred. Typical alkaline catalysts that may be used are the hydroxides or carbonates of cesium, rubidium, potassium, sodium and lithium. Alkaline compounds of the alkali metals such as sodium alcoholate or sodium phenate as well as organic bases such as triethanolamine may similarly be employed.

Illustrative examples follow:

*Example I*

To 7 parts by weight of a liquid potentially reactive phenol-formaldehyde resinous condensation product (prepared by reacting 3.6 parts by weight of phenol with 6.15 parts by weight of 37% aqueous formaldehyde in the presence of a small quantity of sodium hydroxide solution as catalyst, and then concentrating to a net weight of 7 parts) there are added 13 parts by weight of "amino AFR," that is to say, the reaction product of ammonia with the "standard AFR" described in U. S. Patent 2,191,802. The mixture is stirred and heated under vacuum so as to effect the necessary reaction and the removal of ready volatiles. When the reaction has progressed far enough and a grindably hard resin has come into being (in a kettle with a jacket temperature of in the neighborhood of 200° F. this requires approximately 2 hours) the resin is removed from the reaction vessel. If the time temperature schedule is too severe, the resin may become "rubbery" or wholly infusible. Nominally the resin is possessed of a dark brown color, is readily fusible and is soluble in appropriate media.

"Amino-AFR" may be prepared as follows (see Example I of copending application Serial No. 22,726): One hundred parts by weight of an acetone - formaldehyde condensation product ("standard AFR" per U. S. Patent 2,191,802) along with 100 parts by weight of concentrated aqueous ammonia (28% $NH_3$) are charged into a steel autoclave. The mixture is stirred until a uniform solution results. The autoclave is then closed and heat is gradually applied until a temperature of approximately 300° F. is obtained. This temperature is maintained for a period of about 3 to 4 hours. The heat is then shut off and the autoclave and its contents permitted to cool. The cooling may be expedited by running cold water through the autoclave jacket or its heating coils. Stirring the autoclave contents during the period of heating or cooling is optional. When the temperature has dropped to below 80° F. the autoclave may be opened up and the contents removed. In this particular reaction a substantial excess of ammonia was included in the charge. For some purposes the solutions may be used "as is." Usually it is desirable to remove the excess ammonia and all or part of the water that is present. This is readily accomplished by placing the reaction mixture into a concentrator or evaporator of one type or another and distilling off the volatiles. If the whole of the volatiles be distilled off the resultant product is, while hot, in a form of a thick viscous, brown colored fluid, and, at room temperature, is in the form of a hard, brown colored, slightly hygroscopic solid.

The above resin is well suited for the manufacture of thermosetting molding compounds. Although its rate of cure is nominally slower than that of the conventional phenol-formaldehyde resin, the speed of cure can be markedly accelerated through the inclusion of appropriate activators and curing agents such as lime, paraformaldehyde, etc. A limitation to its utility resides in the fact that the making of it is somewhat critical and requires careful attention on the part of the operator and the further fact that its fusing point is inclined to be high, resulting in molding compounds possessed of low flow characteristics. Both of these disadvantages may be eliminated by including in the resin mixture appropriate "modifying agents." Although the above resin is thermosetting in character, tests upon the thermoset compound indicate that there are still present substantial quantities of extractibles which have not been adequately "cured." Although such under-cure is no disadvantage for certain applications, nonetheless for many more critical applications it is essential that the ultimate article be fully cured, possessed of a high degree of heat stability and contain very little in the way of extractibles. These ends can be achieved via the incorporation of appropriate "curing agents" or "hardening agents" which are specific in their action toward amino-AFR resins in the same sense that materials such as hexamethylenetetramine are highly efficacious as "hardening agents" for the conventional phenol-formaldehyde resins of the Novolak type.

*Example II*

A potentially reactive phenol-formaldehyde resin containing modifying agents was first prepared by reacting 27.1 lbs. of phenol with 34.6 lbs. of formaldehyde, using 1200 mil of 8/normal sodium hydroxide as catalyst. After heating to just below the boiling point for a period of about 45 minutes there were added 7.5 lbs. of ethylene glycol and 7.5 lbs. of acetanilide. The mixture was then vacuum concentrated to a net weight of approximately 60 lbs. Into a reaction kettle there was then placed a mixture comprising 4 parts by weight of the above plasticized concentrated potentially reactive phenol-aldehyde liquid resin along with 7.5 parts by weight of "amino-AFR" and a small quantity of sodium hydroxide as catalyst (the sodium hydroxide catalyst may be left out without appreciably altering the end results). The mixture was heated and stirred and subjected to vacuum concentration. Utilizing a kettle jacket temperature of no higher than about 220° F. it was found that after approximately two hours substantially the whole of the volatiles had been removed and a grindably hard resin had been engendered. The resin was removed from the kettle, permitted to cool, broken up and ground to size. The product was dark brown in color, was easily fusible, and soluble in appropriate media. The material was well suited for the production of molding compounds and the resultant compounds were possessed of a substantially greater flow than those procured from the resin of Example I. The water resistance of the resultant cured product may be improved by replacing the water-soluble ethylene glycol with a material substantially insoluble in water.

It will be observed that in the foregoing example the fluxing agents or plasticizer (ethylene glycol and acetanilid) were added to the potentially reactive phenol-aldehyde condensation product prior to its concentration. For the purpose of the present invention it is equally expedient to add the fluxing agents or plasticizers at any other time during the processing, e. g., they may be added to the potentially reactive phenol-aldehyde condensation product after concentration, they may be added to the amino-AFR or they may be added to the mixtures of amino-AFR and potentially reactive phenol-aldehyde resin either at the start or at any time during the processing operation.

*Example III*

40 parts by weight of reactive amine prepared after the manner of Example 8 of U. S. Letters Patent application Serial No. 22,726 (ethyl methyl ketone-formaldehyde amine) were charged into a kettle provided with a stirrer and facilities for heating. 10 parts by weight of a potentially reactive phenol-formaldehyde resinous condensation product (similar to that used in Example I) were then stirred in. The mixture was heated to the reflux temperature and then vacuum was cautiously applied. The heating under vacuum was continued until a sample of the mixture, after cooling down to room temperature, was found to be grindably hard. The resin was then removed from the kettle. The resin had a dark brown color, was readily fusible and was more readily soluble than the products of the foregoing examples. The product cured with greater difficulty than those made out of "amino AFR." This type of resin is particularly well suited for use as a modifying agent or as a plasticizer for "amino AFR" resins or for unrelated types of resin.

Example VIII of the said copending application Serial No. 22,726 calls for the reaction of 100 parts of an ethyl methyl ketone-formaldehyde condensation product (prepared after the manner of U. S. Patent 2,191,802) together with 100 parts of concentrated aqueous ammonia (28% $NH_3$) under the conditions set forth above in Example I with regard to a typical method of producing "amino-AFR."

Novel variations in the properties of the resins may be procured via the inclusion of alkyd resins and various vinyl polymers, particularly vinyl materials such as polyvinyl acetate and polyvinyl hydroxy acetate. Ethyl cellulose and similar compounds may be incorporated to advantage. Synthetic rubbers, particularly of the neoprene type, as well as the butadiene-acrylonitrile copolymer type of elastomer lead to the production of novel compositions well suited to specific applications. Resins of the polyester type are quite compatible in these systems.

An almost endless variety of modifications may be achieved through the inclusion of diverse plasticizers, extenders, pigments, fillers, lubricants, dyestuffs, etc.

The resins procured from the reaction between "Amino KAR" and a potentially reactive phenol-aldehyde condensation product are soluble, fusible, possessed of an amber to dark brown color, procurable in a grindably hard form, thermosetting in character, and thermosetting via the action of appropriate curing or hardening agents such as (1) halogenated polymers containing reactive halogen atoms, e. g., resinous chlorinated paraffin (with a chlorine content of in the neighborhood of 70%) and neoprene; (2) polycarboxylic acids; (3) carboxylic acid polymers, e. g., polyacrylic acid and polymethacrylic acid; (4) carboxylic group containing hetero-polymers, e. g., interpolymers of methacrylic acid and acrylonitrile partial saponification products of polymethylmethacrylate; (5) sulfonated resins; (6) furfuramide.

After these resins have been thermoset as above described, they have a dark amber to brown color, are substantially infusible, the bulk of the resin is insoluble in common solvents, and a small quantity of water extractibles are usually present.

The reactions involved are of a relatively straightforward nature and present no particular manipulative or processing difficulties. The almost endless variety of modifications of the resins of the present invention may be achieved through the inclusion of various plasticizers, extenders, pigments, fillers, lubricants, dye stuffs, and the like, thus greatly increasing the capabilities of the basic resins. The fact that they can be obtained in a grindably hard form renders them capable of use in applications where the resinous compositions of the previously mentioned applications, Serial No. 30,733 and Serial No. 40,165, are not usable.

The nitrogenous resins of the present invention constitute a novel and unique class of thermosetting compounds. Compounds and products produced out of the resins of the present invention compare very favorably in their physical and chemical properties with the usual types of thermosetting resins derived from a phenol, urea and melamine by reaction with appropriate aldehydes. It is to be observed that in the production of the resins of the present invention, as against the production of conventional phenol-aldehyde resins, a greatly diminished quantity of phenol is employed, and hence the resins of the present invention free the manufacturers of thermosetting resins from their previous dependence upon adequate supplies of phenol, urea, and melamine, which materials, particularly in times of national emergency, are available for these purposes in rather limited quantities. The resins of the present invention lend themselves to the production of ion exchange resins. The thermoset resins of the present invention are inherently possessed of a high coefficient of friction, thus preeminently suiting these resins to the manufacture of friction elements. The products of the present invention are useful in the manufacture or preparation of such varied products as adhesives, cements, coating compositions, electrical insulation, enamel, modified plastics, fillers for resins and rubbers, floor coverings, friction elements, impregnants, hot molding compositions, cold molding compositions, plywood, proofing compositions, stiffening agents, ion exchange compositions, preparation of electropositively charged colloids, etc.

It will be understood that the examples set forth above are illustrative only and that many modifications and variations may be made in the resins of the present invention and in the methods of procuring the same all within the scope of the following claims.

I claim:

1. An uncured nitrogenous resin comprising the reaction product between a potentially reactive phenol-aldehyde condensation product and a fusible, soluble, substantially non-resinous and substantially non-volatile reactive amine resulting from the reaction between a ketone-aldehyde condensation product and an unsubstituted nitrogenous base, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an unsubstituted aliphatic hydrocarbon radical having from one to four carbon atoms, with an aldehyde having the general formula $R_2—CHO$, wherein $R_2$ represents a member selected from the group consisting of hydrogen and unsubstituted aliphatic hydrocarbon radicals having from one to four carbon atoms, said nitrogenous base possessing an ionization constant of not less than $1 \times 10^{-8}$ and containing at least one reactive hydrogen atom attached to a basic nitrogen atom, said reaction being carried out in the presence of heat.

2. An uncured nitrogenous resin comprising the reaction product between a potentially reactive phenol-aldehyde condensation product and a fusible, soluble, substantially non-resinous and substantially non-volatile reactive amine resulting from the reaction between a ketone-aldehyde condensation product and ammonia, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an unsubstituted aliphatic hydrocarbon radical having from one to four carbon atoms, with an aldehyde having the general formula $R_2—CHO$, wherein $R_2$ represents a member selected from the group consisting of hydrogen and unsubstituted aliphatic hydrocarbon radicals having from one to four carbon atoms, said reaction being carried out in the presence of heat.

3. An uncured nitrogenous resin comprising the reaction product between a potentially reactive phenol-aldehyde condensation product and a fusible, soluble, substantially non-resinous and substantially non-volatile reactive amine resulting from the reaction between a fusible, soluble, substantially non-resinous and substantially non-volatile reactive acetone-formaldehyde condensation product and an unsubstituted nitrogenous base possessing an ionization constant of not less than $1 \times 10^{-8}$ and containing at least one reactive hydrogen atom attached to a basic nitrogen atom, said reaction being carried out in the presence of heat.

4. An uncured nitrogenous resin comprising the reaction product between a potentially reactive phenol-aldehyde condensation product and a fusible, soluble, substantially non-resinous and substantially non-volatile reactive amine resulting from the reaction between a fusible, soluble, substantially non-resinous and substantially non-volatile reactive acetone-formaldehyde condensation product and ammonia, said reaction being carried out in the presence of heat.

5. An uncured nitrogenous resin comprising the reaction product between a potentially reactive phenol-aldehyde condensation product and a fusible, soluble, substantially non-resinous and substantially non-volatile reactive amine resulting from the reaction between a fusible, soluble, substantially non-resinous and substantially non-volatile reactive ethyl methyl ketone-formaldehyde condensation product and ammonia, said reaction being carried out in the presence of heat.

6. An uncured nitrogenous resin comprising the reaction product between a potentially reactive phenol-formaldehyde condensation product and a fusible, soluble, substantially non-resinous and substantially non-volatile reactive amine resulting from the reaction between a ketone-aldehyde condensation product and an unsubstituted nitrogenous base, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an unsubstituted aliphatic hydrocarbon radical having from one to four carbon atoms, with an aldehyde having the general formula $R_2—CHO$, wherein $R_2$ represents a member selected from the group consisting of hydrogen and unsubstituted aliphatic hydrocarbon radicals having from one to four carbon atoms, said nitrogenous base possessing an ionization constant of not less than $1 \times 10^{-8}$ and containing at least one reactive hydrogen atom attached to a basic nitrogen atom, said reaction being carried out in the presence of heat.

7. An uncured nitrogenous resin comprising the reaction product between a potentially reactive phenol-formaldehyde condensation product and a fusible, soluble, substantially non-resinous and substantially non-volatile reactive amine resulting from the reaction between a ketone-aldehyde condensation product and ammonia, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an unsubstituted aliphatic hydrocarbon radical having from one to four carbon atoms, with an aldehyde having the general formula $R_2—CHO$, wherein $R_2$ represents a member selected from the group consisting of hydrogen and unsubstituted aliphatic hydrocarbon radicals having from one to four carbon atoms, said reaction being carried out in the presence of heat.

8. An uncured nitrogenous resin comprising the reaction product between a potentially reactive phenol-formaldehyde condensation product and a fusible, soluble, substantially non-resinous and substantially non-volatile reactive amine resulting from the reaction between a fusible, soluble, substantially non-resinous and substantially non-volatile reactive acetone-formaldehyde condensation product and an unsubstituted nitrogenous base possessing an ionization constant of not less than $1 \times 10^{-8}$ and containing at least one reactive hydrogen atom attached to a basic nitrogen atom, said reaction being carried out in the presence of heat.

9. An uncured nitrogenous resin comprising the reaction product between a potentially reactive phenol-formaldehyde condensation product and a fusible, soluble, substantially non-resinous and substantially non-volatile reactive amine resulting from the reaction between fusible, soluble, substantially non-resinous and substantially non-volatile reactive acetone-formaldehyde condensation products and ammonia, said reaction being carried out in the presence of heat.

10. An uncured nitrogenous resin comprising the reaction product between a potentially reactive phenol-formaldehyde condensation product and a fusible, soluble, substantially non-resinous and substantially non-volatile reactive amine resulting from the reaction between a fusible, soluble, substantially non-resinous and substantially non-volatile reactive ethyl methyl ketone formaldehyde condensation product and ammonia, said reaction being carried out in the presence of heat.

11. The process of forming an uncured nitrogenous resin which comprises reacting, in the presence of heat, a potentially reactive phenol-aldehyde condensation product with a fusible, soluble, substantially non-resinous and substantially non-volatile reactive amine resulting from the reaction between a ketone-aldehyde condensation product and an unsubstituted nitrogenous base, said ketone-aldehyde condensation product being selected from the class consisting of the fusible, soluble, substantially non-resinous and substantially non-volatile reactive condensation products produced by reacting a ketone having the general formula $CH_3-CO-R_1$, wherein $R_1$ represents an unsubstituted aliphatic hydrocarbon radical having from one to four carbon atoms, with an aldehyde having the general formula $R_2-CHO$, wherein $R_2$ represents a member selected from the group consisting of hydrogen and unsubstituted aliphatic hydrocarbon radicals having from one to four carbon atoms, said nitrogenous base possessing an ionization constant of not less than $1 \times 10^{-8}$ and containing at least one reactive hydrogen atom attached to a basic nitrogen atom.

12. The process of forming an uncured nitrogenous resin which comprises reacting, in the presence of heat, a potentially reactive phenol-formaldehyde condensation product with a fusible, soluble, substantially non-resinous and substantially non-volatile reactive amine resulting from the reaction between a ketone-aldehyde condensation product and an unsubstituted nitrogenous base, said ketone-aldehyde condensation product being selected from the class consisting of the fusible, soluble, substantially non-resinous and substantially non-volatile reactive condensation products produced by reacting a ketone having the general formula $CH_3-CO-R_1$, wherein $R_1$ represents an unsubstituted aliphatic hydrocarbon radical having from one to four carbon atoms, with an aldehyde having the general formula $R_2-CHO$, wherein $R_2$ represents a member selected from the group consisting of hydrogen and unsubstituted aliphatic hydrocarbon radicals having from one to four carbon atoms, said nitrogenous base possessing an ionization constant of not less than $1 \times 10^{-8}$ and containing at least one reactive hydrogen atom attached to a basic nitrogen atom.

GEORGE KARL VOGELSANG.

REFERENCES CITED

The following references are of record in the file of this patent:

UNITED STATES PATENTS

| Number | Name | Date |
|---|---|---|
| 2,191,802 | Novotny et al. | Feb. 27, 1940 |